Jan. 28, 1969  J. E. WISER  3,424,877
SWITCH ACTUATOR MEANS INCLUDING A RAPID ADVANCE MECHANISM
Filed July 13, 1966
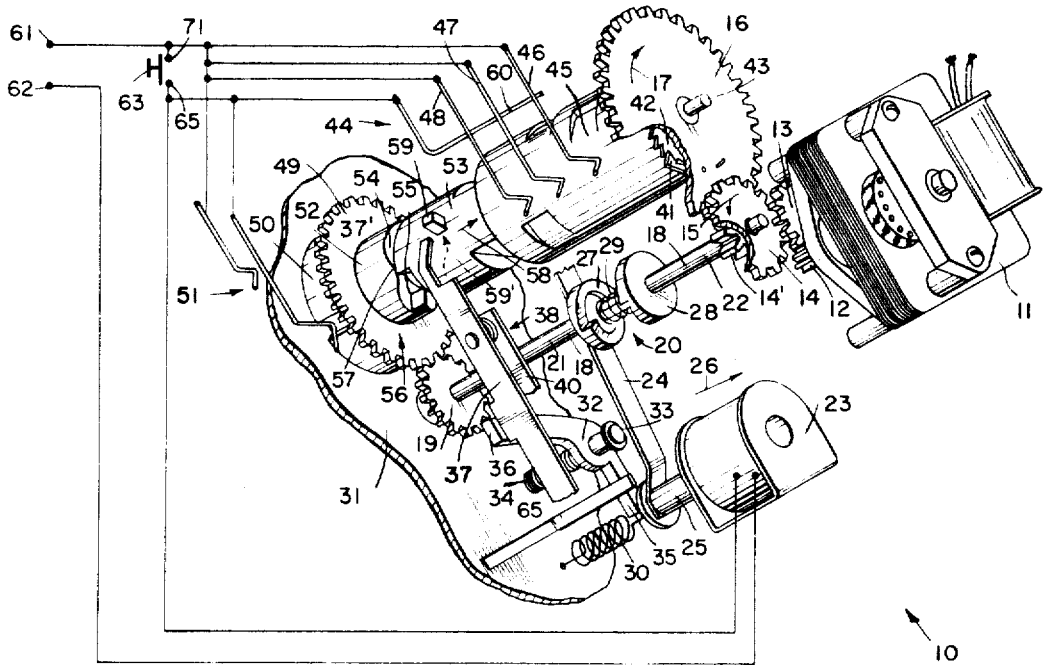
FIG. 1
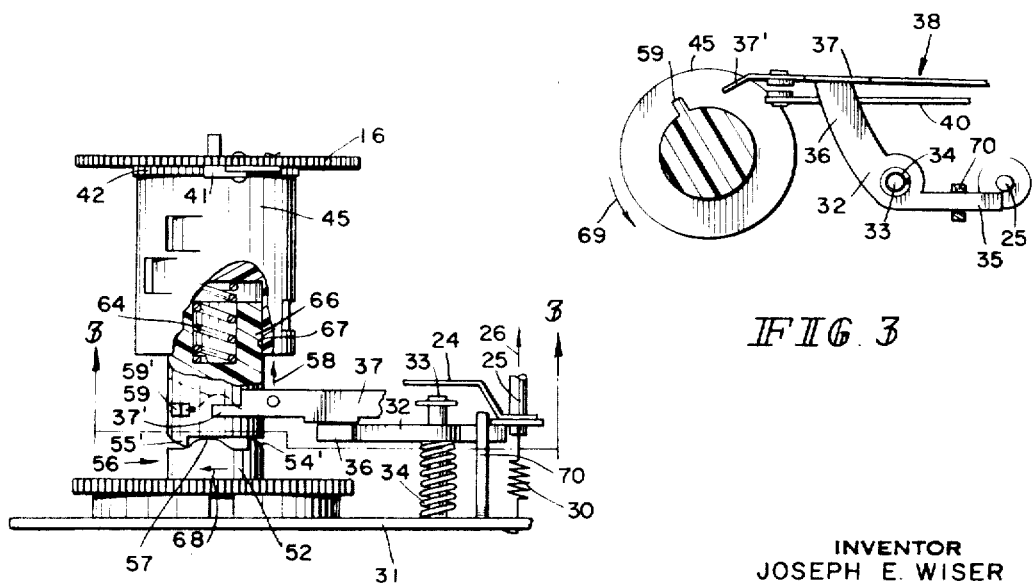
FIG. 2
FIG. 3
INVENTOR
JOSEPH E. WISER
BY
ATTORNEY

United States Patent Office 3,424,877
Patented Jan. 28, 1969

3,424,877
SWITCH ACTUATOR MEANS INCLUDING A
RAPID ADVANCE MECHANISM
Joseph E. Wiser, Indianapolis, Ind., assignor to P. R.
Mallory & Co. Inc., Indianapolis, Ind., a corporation of Delaware
Filed July 13, 1966, Ser. No. 564,979
U.S. Cl. 200—38                 10 Claims
Int. Cl. H01h 7/08, 43/10

The present invention relates to a means and method for opening line switch means of a sequential timer when the timer is rapidly advanced through a cycle or to a particular starting point within a cycle.

Although the present invention is adaptable for use in a multiplicity of electromechanical devices, a particularly useful application of the present invention is found in electromechanical control devices such as for example sequential timers and the like utilized to regulate cycle programs of electrical appliances such as washing machines, dishwashers, dryers, and the like. Generally, the electromechanical sequential timers utilized to control the sequence of operation of the cooperatively associated electric appliance are of the type having a plurality of drum-like cams attached to a rotatably driven shaft. The drum-shaped cam or cams have peripheral coded indicia, generally rise and fall contours, on which one or more follower switches ride. The state of actuation of any particular follower switch is determined by the contours of the drum-shaped cam cooperatively associated with the follower switch. Each follower switch effectively controls the state of actuation of an electrical circuit associated therewith. Such electrical circuits control the cycling of the electrical appliance.

Several of the prior art sequential timers are equipped with "rapid advance" mechanisms which automatically position a shaft carrying the drum-shaped cams in a predetermined location and therefore place the follower switches riding thereon in a determined state of actuation which corresponds to the selected starting point of the programmed cycle. The "rapid advance" feature incorporated within a sequential timer allows an operator of the electric appliance to locate the desired starting point within the program quickly and efficiently without the necessity of waiting while the timer is rotated at its normal speed to the desired starting point within the programmed cycle.

Several of the presently available sequential timers have line switch means cooperatively associated with the rapid advance mechanism which is biased to an open position with the rapid advance mechanism is activated to thereby terminate the flow of electrical current through the line switch to the follower switch means and means cooperatively associated therewith. The termination of the flow of electrical current through the follower switches to the means associated therewith prevent premature, unnecessary and possibly damaging actuation of said means thereby prolonging the life of said means and in addition allowing the program to be initiated substantially at its normal starting point. For example, if current was allowed to flow through the follower switches as said rapid advance mechanism was actuated, the agitator motor would be falsely started and stopped which has been shown to significantly shorten the useful life of the agitator motor.

However, these several presently available sequential timers necessarily utilize two separate and distinct drive motors to accomplish the above-stated purpose. One of the motors drives the rapid advance mechanism and the remaining motor drives the cam means that is used to program the cycles of the timer. A distinct problem associated with the aforementioned sequential timers is that two motors are required to operate the sequential timer thereby increasing the chance of mechanical and/or electrical failure and increasing the cost of the resultant timer. In addition the cam means driven by one of the motors must be returned to the starting location each time the timer is advanced. This requirement necessitates the use of bidirectional switch means with all problems attendant thereto.

The present invention makes efficient and effective use of a single drive motor to operate the cam means that programs the cycles of the timer and to operate the rapid advance mechanism thereby eliminating several of the problems outlined above which are associated with sequential timers using two separate and distinct drive motors.

Therefore, it is an object of the present invention to provide a line switch actuator means that is operated from the drive motor that drives the cam means that controls the programmed cycles of the sequential timer.

Another object of the present invention is to provide a line switch actuator means wherein the line switch has an actuator arm that rides in close proximity to a rotating member, the axial and rotational position of the rotating member determines the state of actuation of the line switch.

Yet another object of the present invention is to provide a line switch actuator means wherein upon opening of a line switch, the switch is maintained opened by a spring biased arm means until the spring biased arm means is displaced from its engaged position with the line switch.

A further object of the present invention is to provide a line switch actuator means wherein a clutch means is used to determine the axial and rotational position of a rotating actuator means, the rotating means determining the state of actuation of the line switch.

Yet still another object of the present invention is to provide a line switch actuator means that deactivates the sequential timer during the positioning of the timer at the desired starting position.

Another object of the present invention is to provide a line switch actuator means that has optimum reliability characteristics afforded by a compact construction having a minimum number of parts.

A further object of the present invention is to provide a line switch actuator means which can be readily fabricated and formed at low cost.

Still another object of the present invention is to provide a line switch actuator means that makes efficient and effective use of a clutch means included therein to open a line switch at a predetermined interval of time.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawing. The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

FIGURE 1 is a fragmentary, perspective view of the automatic line switch actuator of the present invention.

FIGURE 2 is a side view of a portion of the line switch actuator shown in FIGURE 1 and illustrates the operation of the elements which actuate the line switch.

FIGURE 3 is a sectional view taken across the lines 3—3 of FIGURE 2 illustrating the cooperative relationship between a line switch, an arm means and means for displacing the arm means.

Generally speaking, the line switch actuator means of the present invention is a component part of a rapid advance mechanism of a sequential timer. The line switch actuator means is used to deenergize the sequential programing of the timer as the timer is advanced to a selected starting point. The line switch actuator means includes a first member having a clutch face and an axially displaceable second member having a clutch face. The respective clutch faces lock with each other when the first member is displaced in a first direction by a drive means. The respective clutch faces are free-wheeling of each other when the second member is displaced in the first direction by the drive means thereby providing a unidirectional clutch means. A camming surface is formed on the first member so as the second member is displaced by the drive means, the second member is axially displaced when riding on the camming surface. An actuator means is carried by the second member and is displaced therewith. The actuator means displaces the movable contact carrying blade of a line switch means from engagement with a fixed contact carrying blade thereby deenergizing the sequential programming of the timer when the first member is driven by the drive means. The actuator means bypasses the line switch means when the second member is driven by the drive means and axially displaced by the camming surface of the first member. Arm means retains the blades in a disengaged position after the actuator means has disengaged the movable blade. Solenoid means displaces the arm means from engagement with the line switch means thereby allowing the blades to engage so as to energize the sequential programming of the timer.

Referring now to the drawing, and particularlly to the perspective view of FIGURE 1, the line switch actuator means of the present invention can be visualized in conjunction with the following description.

The line switch actuator means of the present invention, indicated generally by the reference number 10, is a means for opening the line connecting a power source to a timer when the timer is rapidly advanced through a cycle or to a particular cycle. Therefore, the following description will include reference to elements of a sequential timer which are cooperatively associated with the line switch actuator means 10.

A prime mover means such as a motor 11 is utilized for advancing the timer. The motor means 11 includes an output pinion gear 12 which meshes with and rotatably drives an idler gear 13. Another gear 14 meshes with the idler gear 13 so as to be driven in the direction of the arrow 15 when the motor 11 is energized. A pinion gear 14' is adapted to rotate with the gear 14. A gear 16 meshes with the pinion gear 14' so as to be driven in the direction of the arrow 17 when the motor 11 is energized. The gear 14 and pinion gear 14' are mounted on a common shaft 18 which also carries gear 19.

It will be noted in FIGURE 1 that shaft 18 includes thereon a clutch means 20 generally carried near the center of the shaft. The clutch means 20 is a means for disconnectedly joining parts 21 and 22 of the shaft 18 so as to drive the gear 19 at substantially the same speed as the gear 14 and pinion gear 14' are driven. The clutch means 20 is operated by a solenoid means 23 which includes an arm 24 mounted on plunger means 25 of the solenoid. When the solenoid 23 is energized, the plunger 25 and arm 24 are moved in the direction of the arrow carrying clutch face 27 therewith so as to close the normally spaced apart faces 27 and 28 of the clutch means 20 in opposition to spring 29. It will be noted that as a result of the displacement of clutch face 27, spring 29 stores energy. Spring means 30 returns the plunger 25 to its normal position when the solenoid 23 is deenergized. FIGURES 1 and 2 illustrate that the spring means 30 is connected between the plunger 25 and a mounting plate 31 of the timer. An arm means 32 is slidably mounted on post 33. The post is fixedly connected to a mounting frame 31 and extends perpendicularly from the frame. A spiral spring means 34 is wound about the post 33 and biases arm means 32 in the direction of the arrow 26. It is seen that a first end 35 of the arm 32 abuts an extremity of the plunger 25. Thus, whenever the solenoid 23 is energized so that arm 25 is displaced in the direction of arrow 26, arm 32 is biased in the direction of the arrow 26 by the spring 34. A second end 36 of the arm 32 is positioned so as to engage with a movable contact carrying blade 37 of a line switch 38 so as to displace the movable contact carrying blade from engagement with fixed contact carrying blade 40 as the timer mechanism is rotated through a predetermined angular advancement. More particularly, the line switch 38 has its contact carrying blades displaced from a position of engagement to an open position during the entire rapid advancement. The cooperation between the line switch 38 and the arm 32 will be more thoroughly discussed in conjunction with FIGURE 3.

The gear 16 has a pawl 41 pivotally mounted thereon and biased into engagement with ratchet wheel 42 carried by shaft 43. Gear 16 is also carried by shaft 43. Thus, whenever the gear 16 is rotated in the direction of the arrow 17 the ratchet wheel 42 is also rotated in the direction of the arrow 17 due to the coupling between the gear and the ratchet wheel through the pawl. The ratchet wheel 42 is a first means for rotating a time base unit, indicated generally by the reference number 44, which is coaxial with the shaft 43. The time base unit 44 includes a multitracked cam means 45 having peripheral rise and fall contours which actuate plurality of follower arms 46, 47 and 48 riding on the peripheral rise and fall contours.

The gear 19 meshes with gear 49. Gear 49 is mounted coaxially with shaft 43. A control cam means 50 is carried by the gear 49 and actuates a follower switch 51. The function of the control cam 50 and the switch 51 will be discussed herein later.

The shaft 43 extends axially through the gear 49 and control cam means 50 as well as the gear 16 and the time base unit cam 45. First and second rotating members 52 and 53 are disposed on shaft 43 between the gear 49 and the time base unit cam 45. The rotating member 53 includes a double-D portion extending axially into the cam 45 as will be discussed in conjunction with FIGURE 2. A clutch face 54 on the member 52 is used for engaging clutch face 55 on the member 53. The clutch faces 54 and 55 and spring means 64, illustrated in FIGURE 2, comprise clutch means 56 for engaging and driving the time base unit cam 45 through the gear 49. The clutch face 54 also includes a camming surface 57 disposed thereon for momentarily moving the member 53 in the direction of the arrow 58 as the member 53 is rotated with respect to the member 52. It should be noted that the clutch means 56 is free-wheeling when member 53 is rotated with respect to member 52. An actuator means 59 extends from member 53 so as to operate the movable contact carrying blade 37 as the member 53 is rotated through the clutch means 56. When the member 53 is displaced in the direction of the arrow 58 by the camming surface 57, the actuator 59 follows the path represented by the arrow 59' and does not operate the movable contact carrying blade 37.

From the discussion thus far, it can be seen that the pinion gear 14' is engaged with and drives the gear 16 in the direction of the arrow 17. The gear 16 drives through the pawl 41 and ratchet wheel 42 to rotate the multitrack cam means 45 which operates follower arms 46, 47 and 48. The follower arms 46, 47 and 48 and cooperatively associated bar 60 and follower switch 51 operate to provide a predetermined time interval for energizing and de-energizing the solenoid 23. When the solenoid 23 is energized and the clutch means 20 is actuated, the gear 19 is rotated at the same speed as the gear 14 to drive the gear 49. Since the gear 49 is adapted to rotate at a higher rate of speed than the gear 16, the clutch means 56 operates to rotate the multitrack cam means 45 of the time base unit 44. The ratchet wheel 42, therefore, rotates independently of the gear 16 when the multitrack cam means 45 is driven through the gear 49.

Power for the solenoid 23 is provided across the terminals 61 and 62 as shown in FIGURE 1. The circuit from terminal 62 through the solenoid to terminal 61 may be completed by the operation of the follower switch 51 or by the engagement of any one of the follower arms 46, 47 and 48 with the bar member 60 or by the operation of manual switch means 63 to interconnect terminals 65 and 71.

When the solenoid 23 is energized to displace the plunger in the direction of the arrow 26, the arm 32 would be free to move in the direction of the arrow 26 but for the movable contact carrying blade 37 which is in an interference path with end 36 of the arm 32. When the clutch means 56 is engaged for a rapid advance and the actuator 59 is rotated through a complete revolution to displace the movable contact carrying blade 37, the arm 32 no longer restrained by blade 37 is displaced in the direction of arrow 26 to retain the movable contact carrying blade 37 in a disengaged position with respect to the fixed contact carrying blade. The arm 32 is displaced in the direction of arrow 26 by the release of stored energy by the spiral spring means 34. The operation of the arm 32 will be discussed more thoroughly in conjunction with FIGURE 3. It will be noted that stop means 70 is fixedly connected to the mounting plate 31 and prevents rotation of the arm 32 about the post 33.

Attention is directed to FIGURE 2, a view illustrating the operation of the clutch means 56, line switch 38, arm 32 and actuator 59.

As stated previously, the member 53 has a double-D portion, indicated by the reference number 66, extending into an axial, double-D opening 67 in the multitrack cam means 45. The aforementioned spring 64 is positioned so as to bias member 53 against member 52 thereby engaging clutch means 56. As gear 49 is driven in the direction of the arrow 68, the clutch face 54 of member 52 rotates with respect to clutch face 55 of member 53 to a point where the faces are engaged with each other. More particularly, the clutch means 56 is engaged when the rectangular face 54' of clutch face 54 engages rectangular face 55' of clutch face 55. As disclosed hereinbefore, when the member 53 is driven through the gear 16, the camming surface 57 cooperates with the apex of the rectangular face 55' to momentarily move the member 53 in the direction of the arrow 58 thereby causing the actuator 59 to move through the path represented by the arrow 59'. The dotted line path illustrated in FIGURE 2 is the path travelled by actuator 59. It will be noted that the path of travel of the actuator 59 during this portion of the cycle prevents the actuator from engaging with the end portion 37' of the contact carrying blade 37.

Referring now to FIGURE 3 which is a sectional view taken across the lines 3—3 of FIGURE 2 illustrating the cooperative relationship between actuator 59, line switch 38 and arm 32 will be described.

As the member 53 and multitrack cam means 45 are rotated in the direction of the arrow 69 by the gear 49, the actuator 59 is arranged to displace movable contact carrying blade 37 with respect to the fixed contact carrying blade 40. When the movable contact carrying blade 37 is displaced so that said blade is no longer in an interference path with extremity 36 of arm 32, the arm 32 is displaced by the spring 34 to an abutting relationship with the movable contact carrying blade thereby preventing the movable contact carrying blade from engaging with the fixed contact carrying blade.

With the above structural description in mind and by continued reference to the several figures of the drawing, the following analysis of operation of the present invention will further serve to amplify the novelty of the present invention.

As stated previously, the present invention is a means for opening the line switch of a timer when the timer is rapidly advanced through a cycle or to a particular cycle starting point. The line switch 38 is biased to an open position after the actuator 59 is rotated through a complete revolution. By referring to FIGURE 1 it can be seen that a rapid advance can be initiated by operating the manual switch 63 to energize the solenoid 23 to operate the clutch means 20. Operation of clutch means 20 causes the gear 49 to be driven at a higher rate of speed than the gear 16 and, therefore, the members 52 and 53 and the multitrack cam means 45 are driven through the gear 49. The gear 49 will continue to be driven by the gear 19 as long as the clutch means 20 is engaged. The first complete revolution of the member 53 after the clutch 56 is engaged causes the actuator 59 to displace the movable contact carrying blade 37 from the fixed contact carrying blade 40. Once the movable contact carrying blade 37 is disengaged from the fixed contact carrying blade, the arm 32 retains the movable contact carrying blade in an end open position until the solenoid 23 is de-energized.

The rotational displacement of actuator 59 does not displace the movable contact carrying blade 37 when the member 53 is rotatably driven through gear 16. As discussed previously, this feature is accomplished by camming surface 57 cooperating with the notch 55' to move the member 53 in the direction of arrow 58 when the actuator moves by the portion 37' of the movable contact carrying blade 37.

The multitrack cam means 45 and the follower arms 46, 47 and 48 and bar 60 associated therewith are a means for energizing the solenoid 23 at different time intervals during the rotation of the multitrack cam means 45. Therefore, by selectively actuating one of the follower arms 46, 47 or 48 to an engaged position with bar 60, a predetermined time interval for energizing the solenoid 23 is established. When the solenoid 23 is initially energized through one of the follower arms 46, 47 or 48, the clutch means 20 is operated and the gear 49 is driven by the gear 19. The control cam 50 which rotates with the gear 49 open circuits the solenoid 23 when the cam is rotated back to its starting point shown in FIGURE 1.

While the invention is illustrated and described in an embodiment, it will be understood that modifications and variations may be effected without departing from the scope of the novel concepts of this invention.

Having thus described my invention, I claim:

1. In a sequential timer, a rapid advance means including drive means connected to a line switch actuator means for deenergizing sequential programming of said timer, said line switch actuator means comprising a first member and a second member having clutch faces, said clutch faces locking each with the other when displaced in a predetermined direction by said drive means thereby providing a unidirectional clutch means, an actuator means carried by one of said members and displaced therewith, said actuator means displacing a movable contact carrying blade of a line switch means from engagement with a fixed contact carrying blade thereby de-energizing said sequential programming of said timer, arm means retaining said blades in a disengaged position after said actuator means has disengaged said movable blade, and means displacing said arm means from engagement with said line switch means thereby allowing said blades to engage so as to energize said sequential programming of said timer.

2. In a sequential timer, a rapid advance means including drive means connected to a line switch actuator means for deenergizing sequential programming of said timer, said line switch actuator means as claimed in claim 1, wherein said first member has a camming surface formed thereon so that said second member is displaced by said camming surface when riding thereon causing said actuator means to bypass said line switch means.

3. In a sequential timer, a rapid advance means including drive means connected to a line switch actuator means for deenergizing sequential programming of said timer, said line switch actuator means as claimed in claim 1, wherein said means displacing said arm means is a solenoid means.

4. In a sequential timer, a rapid advance means including drive means connected to a line switch actuator means for deenergizing sequential programming of said timer, said line switch actuator means as claimed in claim 3, wherein said solenoid means biases said arm means from retaining said blades in a disengaged position until said solenoid means is actuated.

5. In a sequential timer, a rapid advance means including drive means connected to a line switch actuator means for deenergizing sequential programming of said timer, said line switch actuator means as claimed in claim 4, wherein said arm means includes a compressed spring bias means that biases said arm into engagement with said solenoid means.

6. In a sequential timer, a rapid advance means including drive means connected to a line switch actuator means for deenergizing sequential programming of said timer, said line switch actuator means as claimed in claim 5, wherein said arm means includes a first end biased toward said solenoid means and a second end biased toward said line switch means.

7. In a sequential timer, a rapid advance means including drive means connected to a line switch actuator means for de-energizing sequential programming of said timer, said line switch actuator means comprising a first member having a clutch face and an axially displaceable second member having a clutch face, said clutch faces locking each with the other when said first member is displaced in a first direction by said drive means and said clutch faces free-wheeling of each other when said second member is displaced in said first direction by said drive means thereby providing a unidirectional clutch means, a camming surface formed on said first member so as said second member is displaced by said drive means said second member is axially displaced when riding on said camming surface, and actuator means carried by said second member and displaced therewith, said actuator means displacing a movable contact carrying blade of a line switch means from engagement with a fixed contact carrying blade thereby deenergizing said sequential programming of said timer when said first member is driven by said drive means, said actuator means bypassing said line switch means when said second member is driven by said drive means and axially displaced by said camming surface of said first member, arm means retaining said blades in a disengaged position after said actuator means has disengaged said movable blade, and solenoid means displacing said arm means from engagement with said line switch means thereby allowing said blades to engage so as to energize said sequential programming of said timer.

8. In a sequential timer, a rapid advance means including drive means connected to a line switch actuator means for deenergizing sequential programming of said timer, said line switch actuator means as claimed in claim 7, wherein said camming faces of said first and second members include rectangular faces for locking with each other when said first member is rotated in said predetermined direction.

9. In a sequential timer, a rapid advance means including means connected to a line switch actuator means for deenergizing sequential programming of said timer, said line switch actuator means as claimed in claim 7, wherein said solenoid means biases said arm means from retaining said blades in a disengaged position until said solenoid means is actuated.

10. In a sequential timer, a rapid advance means including means connected to a line switch actuator means for deenergizing sequential programming of said timer, said line switch actuator means as claimed in claim 9, wherein said arm means includes a first end biased toward said solenoid means and a second end biased toward said line switch means.

References Cited

UNITED STATES PATENTS

| | | | |
|---|---|---|---|
| 2,193,297 | 3/1940 | Schneider | 200—38 |
| 2,458,853 | 1/1949 | Hughes | 200—38 |
| 2,897,890 | 8/1959 | Demi | 200—38 |
| 3,221,117 | 11/1965 | Simmons | 200—38 |

ROBERT K. SCHAEFER, *Primary Examiner.*